United States Patent [19]

Davis

[11] Patent Number: 4,760,996

[45] Date of Patent: Aug. 2, 1988

[54] DAMPER AND ISOLATOR

[75] Inventor: Lawrence P. Davis, Phoenix, Ariz.

[73] Assignee: Honeywell Inc., Minneapolis, Minn.

[21] Appl. No.: 110,076

[22] Filed: Oct. 9, 1987

Related U.S. Application Data

[63] Continuation of Ser. No. 873,742, Jun. 12, 1986, abandoned.

[51] Int. Cl.[4] .................................................. F16F 5/00
[52] U.S. Cl. ..................................... 267/122; 188/276; 188/298; 267/221; 267/136
[58] Field of Search ............... 188/276, 298; 267/221, 267/225, 122, 64.27, 136, 137, 123

[56] References Cited

U.S. PATENT DOCUMENTS

| | | | |
|---|---|---|---|
| 1,729,565 | 9/1929 | Caretta | 267/35 |
| 2,559,047 | 7/1951 | Porter et al. | 188/276 |
| 2,562,195 | 7/1951 | Lee | 267/140.1 |
| 3,243,154 | 3/1966 | Dryden | 267/152 X |

FOREIGN PATENT DOCUMENTS

| | | | |
|---|---|---|---|
| 754307 | 11/1933 | France | 267/64.27 |
| 137636 | 8/1984 | Japan | 267/122 |
| 345548 | 3/1931 | United Kingdom | 267/64.27 |
| 845539 | 8/1960 | United Kingdom | 188/298 |
| 1175255 | 12/1969 | United Kingdom | 188/298 |
| 466352 | 7/1975 | U.S.S.R. | 188/298 |

*Primary Examiner*—George E. A. Halvosa
*Attorney, Agent, or Firm*—Seymour Levine; Albin Medved

[57] ABSTRACT

A vibration damping and isolation apparatus wherein in damping is obtained by purely viscous fluid shear forces. The fluid is sealed in two chambers divided by a orifice to permit fluid flow. Chamber containment of the fluid and chamber volume change is provided by metal bellows which are arranged to provide a constant overall volume. Coulomb forces are avoided by the elimination of rubbing surfaces.

2 Claims, 1 Drawing Sheet

DAMPER AND ISOLATOR

This application is a continuation of application Ser. No. 873,742 filed June 12, 1986, now abandoned.

BACKGROUND OF THE INVENTION

1. Field of the Invention

The invention relates to the field of vibration isolation and more particularly to vibration damping and isolation for devices having extremely low vibration specifications.

2. Description of the Prior Art

Reaction wheel assemblies on pointing control systems are crucial elements of a telescopic system. These assemblies, however, significantly contribute vibration components to the system during operation. Since telescopes have stringent pointing requirements there is a need to isolate the vibration induced by the reaction wheel, most significantly of which are caused by the axial forces attributable to the bearing of the ball on the inner and outer races and imperfections in the ball itself.

One prior art solution to the problem, known as a wire rope, utilizes several stranded wires wrapped in a circle and attached at one end to a base or ground and at the other end to the device or payload to be isolatd. Compliance and isolation are provided by the flexibility of the wire and Coulomb damping or energy absorption is provided by the wires rubbing together. This device has several short comings which include, low damping and stiffness characteristics which are variable with the magnitude of the input vibration level, performance changes with environmental variations, and mathematical complexities that require an iteration procedure of design and test before reaching a final configuration.

A second solution of the prior art utilizes viscoelastic materials as the isolating element. These devices though capable of providing isolation for most applications, exhibit excessive sensitivity to temperature and other environmental conditions.

SUMMARY OF THE INVENTION

In accordance with the present invention vibration isolation and damping is achieved with an arrangement of bellows, coil spring, and fluid which eliminate rubbing surfaces, thereby Coulomb forces, and provide a stiffness that is independent of the vibration level. First and second belows are positioned in axial alignment and fluidly sealed at opposite ends by an end piece and base respectively to form inner chambers. A shaft extending along the common axis is attached to the end piece and base to maintain a fixed separation distance therebetween. A piston having an axial bore hole and a flange extending therefrom for coupling to a payload is positioned about the shaft in a coaxial relationship, forming a fluid gap between it and the shaft. This fluid gap coupled fluid chambers in the first and second bellows that are formed between the piston, the inner walls of the bellows, and the flange extension from the piston to which the previously unsealed ends of the bellows are sealed to provide for fluid containment. This arrangement obtains damping by purely viscous fluid shear forces and completely avoids any rubbing surfaces, thereby eliminating Coulomb forces. The fluid is sealed in the two fluid chambers and the gap formed between the piston the shaft. As the payload moves the volume of one chamber increases, while the volume of the second decreases. The overall volume, due to the fixed distance between the end piece of the first bellows and the base piece of the second bellows maintained by the shaft, remains constant. Thus, fluid of constant volume that is contained within the two chambers and the gap is distributed to the chambers in accordance with the movement of the load. Damping coefficients for the invention vary as a function of fluid viscosity and the radial length of the gap, increasing as the viscosity increases and the radial length decreases. A spring externally coiled about the bellows supports the flange and provides stiffness to the vibration isolator.

Temperature compensation may be achieved by providing a third bellows which is axially aligned with the first and second bellows, and has a fluid chamber therewithin coupled to the fluid system of the first and second bellows to provide for the exchange of fluid between the temperature compensator and the main vibration isolator. This fluid exchange causes a constant fluid pressure to be maintained in the system with temperature variations. A spring externally coiled about the temperature compensating bellows maintains an axial force thereon to achieve a positive pressure on the internal fluid, over the temperature range of interest, independent of the environmental pressure.

DESCRIPTION OF THE PREFERRED EMBODIMENTS

Figure 1:
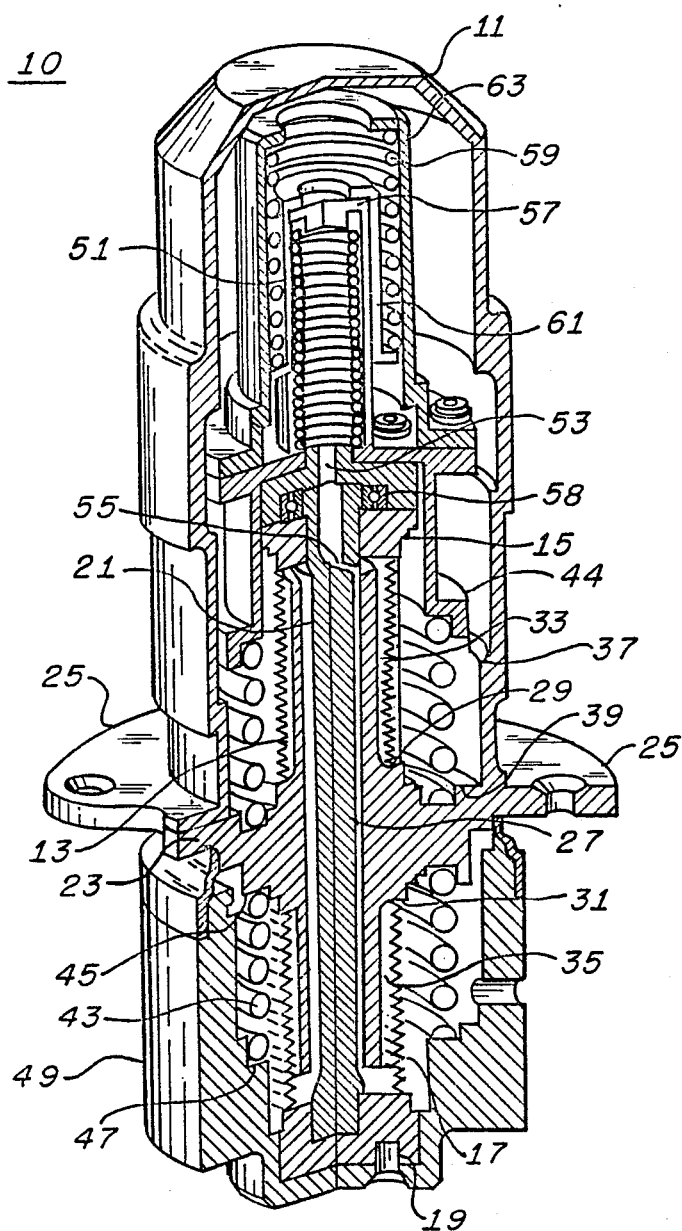
FIG. 1 is a cutaway view of a vibration damper and isolator, including a temperature compensating element, constructed in accordance with the principles of the invention.

The invention will be described with respect to FIG. 1. A vibration damper and isolator 10 includes a cover 11 enclosing a upper bellows 13 with an end piece 15 bonded at one end to provide a fluid seal and structural integrity. A lower bellows 17 with a base piece 19 bonded to one end, also to provide a fluid seal and structural integrity is positioned in axial alignment with the upper bellows. Each bellows may have a wall thickenss of 75 micrometers and may be electroplated. A rigid shaft 21, coaxial with the upper and lower bellows, is bonded to the end piece 15 and the base 19 to maintain a fixed distance therebetween and thereby, a constant volume within the bellows assembly. A piston 23, having an axial bore and a flange 25 extending therefrom, is coaxially positioned about the shaft 21 to create a radial gap 27 therebetween. The section of the upper bellows opposite the end piece is bonded to an upper surface 29 of the flange extension of the piston, while the section of the lower bellows opposite the base piece 19 is bonded to a lower surface 31 of the flange extension. An upper fluid reservoir 33 and a lower fluid reservoir 35 are respectively formed by the upper and lower bellows in combination with the flange extension and the outer surface of the piston wall. Fluid, which may be Dow Corning 200 Series silicone, is installed in the system to completely fill the reservoirs 33, 35 and the gap 27. This fluid, during vibration, is forced between the upper reservoir 33 and the lower reservoir 35 via the damping gap 27. Though the volume of the upper and lower reservoirs 33, 35 may change with the motion of the payload attached to the flange, the total reservoir volume remains constant due to the fixed distance maintained by the shaft 21 between the end piece 15 and the base piece 19. Consequently, motion by the payload and flange 25 must produce equal but opposite volume changes in the upper and lower reservoirs 33, 35.

An upper stainless steel spring 37 is coiled about the outer surface of the upper bellows 13 between the upper surface 39 of the flange extension 25 and a spring retainer 41 bolted to the end piece 15. A lower stainless steel spring 43 is coiled about the outer surface of the lower bellows 17 between the lower surface 45 of the flange extension and a spring retainer surface 47 formed in the skirt 49 extending from the base 19. These springs provide appropriate radial and axial stiffness for the vibration damper and isolator.

Figure 2:
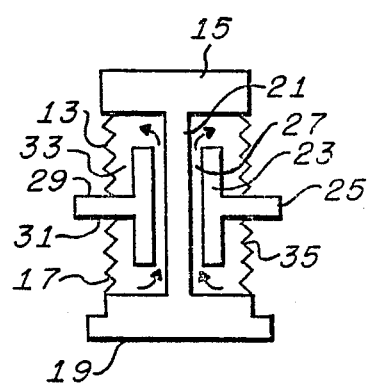
FIG. 2 is a schematic diagram of the vibration damper and isolator of FIG. 1.

Refer now to the schematic diagram of the vibration damper and isolator shown in FIG. 2, wherein elements previously cited bear the initially assigned reference numerals. In FIG. 2 it is schematically shown that the end piece 15 and the base piece 19 are maintained at a fixed separation distance by a rigid shaft 21. A piston 23, with an axial bore, is coaxially positioned about the shaft 21. Extending from the piston is a flange 25 for attachment to the load. The upper bellows 13 is bonded to the end piece 15 and to the upper surface 29 of the flange extension, while the lower bellows 17 is bonded to the base 19 and the lower surface 31 of the flange extension. It is apparent from FIG. 2 that the total volume of the fluid contained between the end piece 15, the base 19, the upper bellows 13 and the lower bellows 17 is constant. Assume an upward force is exerted on the base 19, decreasing the volume of the lower reservoir 35. This causes the volume of the upper reservoir 33 to increase and a fluid flow through the damping gap 27 from the lower reservoir 35 to the upper reservoir 33, equalizing the forces on the upper and lower surfaces of the flange extension, thereby causing the flange to remain stationary.

Referring again to FIG. 1. Temperature compensation for fluid volume variation with temperature is provided by coupling thermal compensator bellows 51 through relief gap 53 and fluid channel 55 to the upper bellows 13. The thermal compensator bellows 51 is fluidly sealed by a cap 57 and the internal region of the bellows 51, the thermal compensator relief gap 53 and the relief channel 55 are filled with fluid to eliminate all air gaps in the system. An "O" ring 58 between the thermal compensator bellows 51 and the upper bellows 13 completes the fluid seal. Fluid expansion due to a temperature increase causes the thermal compensator bellows 51 to expand, thereby relieving an over pressure condition in the reservoirs 33, 35 and damping gap 27 of the vibration damper and isolator to maintain constant sysem pressure.

An axial force is maintained on the thermal compensator bellows 51 by a stainless steel preload spring 59 to establish a positive pressure on the internal fluid over a wide range of atmospheric pressure conditions. Spring 59 is held in place by a lower retainer 61 coupled to the cap 57 and bolted to the spring retainer 41 and an upper retainer 63 extending for a predetermined distance above the lower retainer and also bolted to the spring retainer 41.

While the invention has been described in its preferred embodiments, it is to be understood that the words which have been used are words of description rather than limitation and that changes may be made within the purview of the appended claims without departing from the true scope and spririt of the invention in its broader aspects.

I claim:

1. A vibration isolation and damping apparatus comprising:
    a first bellows having a first end with an end piece thereat forming a fluid seal and a second end;
    a second bellows coaxially aligned with said first bellows and having a first end with a base piece thereat forming a fluid seal and a second end;
    a shaft of predetermined length coaxially positioned with said first and second bellows and coupled to said end and base pieces, thereby maintaining a fixed predetermined separation therebetween;
    a piston having an axial bore coaxially positioned with said shaft and having a flange extension coupled to said second end of said first bellows and to said second end of said second bellows to establish fluid seals with said first and second bellows, said flange extension having flange means for coupling said apparatus to a payload, said piston forming a first fluid chamber with said first bellows, a second fluid chamber with said second bellows, and a radial gap with said shaft, said radial gap providing fluid coupling between said first and second fluid chambers;
    a fluid filling said first and second fluid chambers and said radial gap;
    spring means coiled about said first and second bellows positioned between said flange extension and said end piece and between said flange extension and said base piece for providing radial and axial stiffness, said spring means including:
    a first spring retainer coupled to said end piece;
    a first spring coiled about said first bellows and positioned between said first spring retainer and said flange extension;
    a second spring retainer coupled to said base piece; and
    a second spring coiled about said second bellows and positioned between said second spirng retainer and said flange extension;
    a thermal compensator bellows having an inner chamber fluid filled and fluidly coupled to said radial gap and to said first and second fluid chambers; and
    pressure means coupled to said thermal compensator bellows for establishing positive pressure on said fluid with variations of atmospheric pressure conditions;
    said thermal compensator bellows expanding with expansions of said fluid and cooperating with said pressure means to maintain constant system pressure.

2. A vibration isolation and damping apparatus in accordance with claim 1 wherein said pressure means includes:
    a first retainer coupled to said end piece;
    a second retainer coupled to said first retainer and extending a predetermined distance above said first retainer; and
    a preload spring positioned between said first and second retainers and coiled about said thermal compensator bellows.

* * * * *